US005205747A

United States Patent [19]

Tan

[11] Patent Number: 5,205,747

[45] Date of Patent: Apr. 27, 1993

[54] BEAD CALCULATOR EDUCATIONAL TOY

[76] Inventor: Daravuth Tan, 1821 Josey La., Apt. G, Carrollton, Tex. 75006

[21] Appl. No.: 882,577

[22] Filed: May 13, 1992

[51] Int. Cl.[5] ........................ G06C 1/00; G09B 19/02; G09B 23/02; G09B 23/04

[52] U.S. Cl. .................................... 434/203; 434/215

[58] Field of Search ............... 434/203, 204, 205, 208, 434/209, 215

[56] References Cited

U.S. PATENT DOCUMENTS

| | | | |
|---|---|---|---|
| 541,787 | 6/1895 | Hegewald et al. . | |
| 560,651 | 5/1896 | Rodelsperger . | |
| 580,516 | 4/1897 | Andrew . | |
| 894,043 | 7/1908 | Oldroyd . | |
| 1,028,212 | 6/1912 | Hegewald . | |
| 1,392,578 | 10/1921 | Jones | 434/203 |
| 1,694,405 | 12/1928 | Troidl | 433/203 |
| 2,494,497 | 1/1950 | Trapnell . | |
| 3,283,420 | 11/1966 | Schott | 434/205 |
| 3,491,460 | 1/1970 | Novak | 434/209 |
| 3,523,377 | 8/1970 | Gardner | 434/209 |
| 3,743,750 | 7/1973 | Hurue . | |
| 3,873,096 | 3/1975 | Shoptaugh | 273/156 |
| 4,884,973 | 12/1989 | Pak | 434/191 |
| 4,993,952 | 2/1991 | Yeh | 434/191 |

FOREIGN PATENT DOCUMENTS

| | | | |
|---|---|---|---|
| 25443 | 7/1883 | Fed. Rep. of Germany | 434/203 |
| 930494 | 1/1960 | United Kingdom | 434/204 |

*Primary Examiner*—Gene Mancene
*Assistant Examiner*—Cindy A. Cherichetti
*Attorney, Agent, or Firm*—Konneker & Bush

[57] ABSTRACT

An educational toy useable to teach elementary mathematics to children includes a spaced series of mutually aligned parallel rods secured in a side-by-side relationship at their opposite ends to a base portion of the toy. Series of counting beads are captively and slidably mounted on all but two of the rods for movement between their opposite end portions. The remaining two rods, each of which has at least one counting bead rod on each of its opposite sides, slidably carry two operational sign beads having convex polygonal cross-sections. Different equation operation sign indicia are suitably positioned on the flat exterior side surfaces of the sign beads such that they can be rotated about their rods to display selected operational signs to the user of the toy. Opposite end faces on each of the sign beads are recessed to nonrotatably receive projecting boss portions of the base at the opposite ends of the sign bead rods, thereby permitting the sign beads to be releasably locked against rotation away from their selected sign display orientations. By sliding the two sign beads and appropriate groups of the counting beads onto the same end portions of their associated rods, and rotatably adjusting the sign beads, a variety of simple mathematical equations can quickly and easily be represented by the beads in a form easily understood by a child.

10 Claims, 3 Drawing Sheets

BEAD CALCULATOR EDUCATIONAL TOY

BACKGROUND OF THE INVENTION

The present invention relates generally to educational toys, and more particularly relates to toys used to teach elementary mathematics to children.

In the past, various abacus-like devices and toys have been proposed to visually teach selectively variable mathematical relationships to children. Examples of such devices and toys may be found in U.S. Pat. No. 541,787 to Hegewald et al; U.S. Pat. No. 560,651 to Rodelsperger; U.S. Pat. No. 580,516 to Andrew; U.S. Pat. No. 1,028,212 to Hegewald; U.S. Pat. No. 4,884,973 to Pak; and U.S. Pat. No. 4,993,952 to Yeh. Examples of similar educational devices and toys using slidably mounted, adjustable counting members to depict various mathematical relationships may be found in U.S. Pat. No. 894,043 to Olroyd; U.S. Pat. No. 1,392,578 to Jones; U.S. Pat. No. 2,494,497 to Trapnell; and U.S. Pat. No. 3,743,750 to Hurue.

All of these prior art devices are subject to at least one of the following limitations and disadvantages: (1) the device is capable of representing only a limited number of mathematical relationships, such as counting functions, and cannot be used to depict an equation; (2) the device is of a complex construction making it difficult for a child to properly manipulate; (3) the device is visually complex, thereby making it difficult for a child to grasp the mathematical concept which the device is intended to display; and/or (4) the device includes loose parts which may be easily separated and lost.

In view of the foregoing, it is accordingly an object of the present invention to provide an improved mathematical education toy which eliminates or at least substantially reduces the above-mentioned problems and limitations commonly associated with previously proposed mathematical education toys and devices as representatively set forth in the above-listed patents.

SUMMARY OF THE INVENTION

In carrying out principles of the present invention, in accordance with a preferred embodiment thereof, an educational toy is provided which is useable to visually teach selectively variable mathematical relationships, such as various counting functions and simple equations, to children. The toy comprises a base portion, a series of first rod members each having first and second end portions, and two second rod members each having first and second end portions.

Means are provided for anchoring the first and second end portions of the first and second rod members to the base portion in a manner positioning the first and second rod members in a mutually spaced side-by-side array in which the first end portions are generally parallel to one another and disposed on one side of the array, the second end portions are generally parallel to one another and disposed on an opposite side of the array, and each of the second rod members is interposed between a different pair of the first rod members.

Series of counting beads are captively carried by the first rod members for sliding movement thereon between the first and second end portions thereof. First and second operational sign beads are respectively and captively carried by the second rod members for rotation relative thereto and sliding movement thereon between the first and second end portions thereof. Each of the first and second operational sign beads has a side periphery circumscribing its associated second rod member and defined by flattened areas a selectively variable one of which may be rotated to an orientation in which it generally faces the user of the toy.

Mathematical operating sign indicia are suitably imprinted on the flattened side periphery areas of the operational sign beads. These two beads preferably have generally cubic configurations, thereby providing each of these two beads with four flat side surfaces. Representatively, the mathematical operating sign indicia on the four flat sides of the first operational sign bead comprises the symbols "+", "−", "×" and "=", and the mathematical operating sign indicia on the four flat sides of the second operational sign bead comprises the symbols "=", "÷", "<" and ">".

With all of the beads positioned on, for example, the first end portions of their associated rods, various bead representations of simple equations can be easily and quickly constructed simply by sliding appropriate groups of the counting beads onto the second end portions of their associated rod members, sliding the operational sign beads onto the second end portions of their associated rod members, and rotationally adjusting the operational sign beads in a manner such that the desired mathematical signs thereon face the user of the toy.

According to a feature of the present invention, cooperating interengageable means are provided on the base portion and the first and second operational sign beads for releasably locking such beads against rotation relative to their associated second rod members when the operational sign beads are moved along either of the first and second end portions of the second rod members to positions adjacent the base portion. The rotationally locked operational sign beads may be rotationally adjusted to a new sign indicia display position simply moving the beads inwardly along their associated second rods to unlock the beads, appropriately rotating the beads to a new position, and then sliding the adjusted beads into adjacency with the base portion to relock the beads in their adjusted rotational orientations.

DETAILED DESCRIPTION

Figure 1:
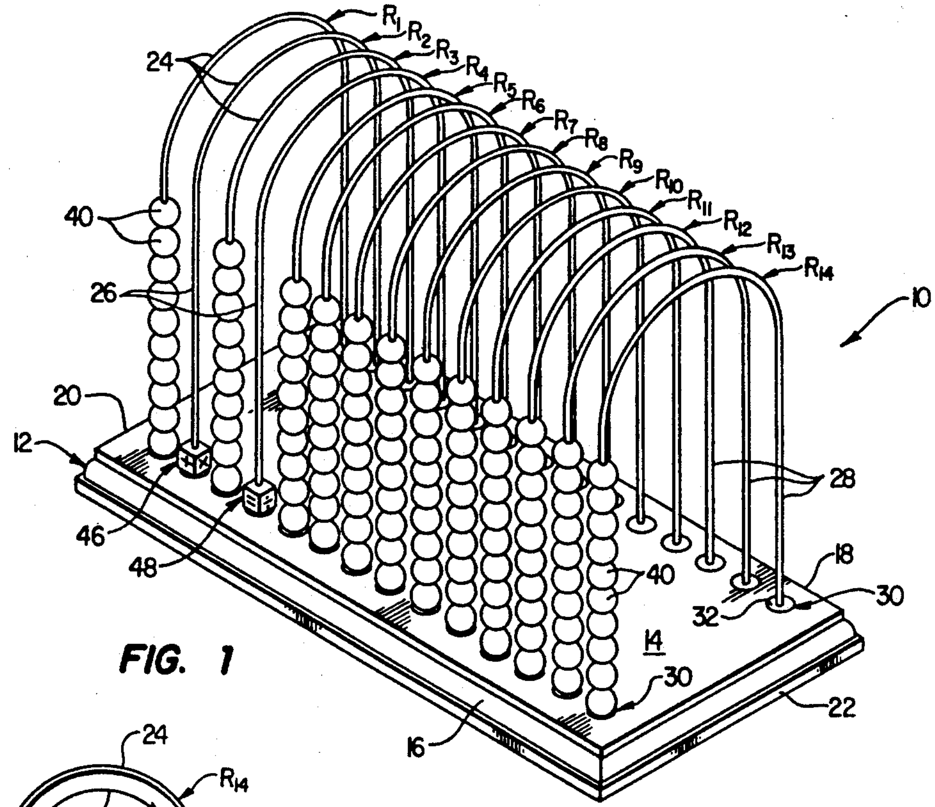
FIG. 1 is a perspective view of a bead calculator educational toy embodying principles of the present invention.
Figure 2:
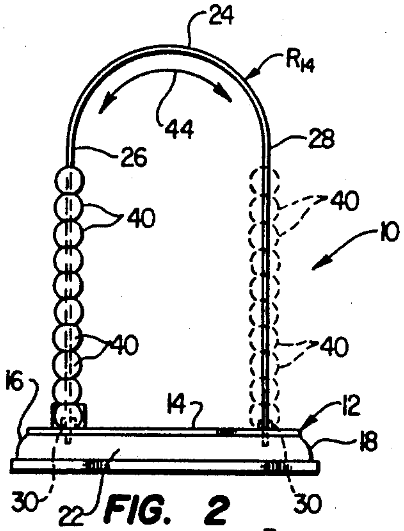
FIG. 2 is a right end elevational view of the toy.

Illustrated in FIGS. 1 and 2 is a bead calculator educational toy 10 embodying principles of the present invention. As subsequently described, the toy may be used to teach children simple mathematical procedures such as counting and constructing equations. The toy 10 includes an elongated rectangular wooden base 12 having a top side surface 14, front and rear side edges 16 and 18, and left and right end edges 20 and 22. If desired, the base could be formed from a suitable material other than wood.

Extending rightwardly from adjacent the left end edge 20 of the base 12 are a spaced apart series of fourteen inverted U-shaped support rods $R_1$–$R_{14}$ that project upwardly from the top side surface 14 of the base 12, the support rods having curved upper end portions 24, vertical front side legs 26 positioned in a mutually aligned relationship inwardly adjacent the front side edge 16 of the base 12, and vertical rear side legs 28 positioned in a mutually aligned relationship inwardly adjacent the rear side edge 18 of the base 12.

Figure 5:
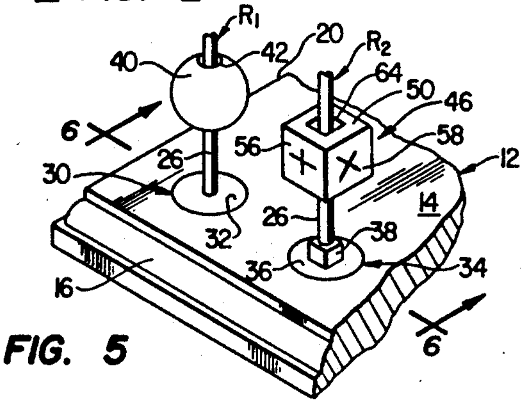
FIG. 5 is an enlarged scale perspective view of a bottom left front corner portion of the toy as shown in FIG. 1, with a horizontally adjacent pair of bead portions of the toy being lifted off a base portion thereof for illustrative purposes.
Figure 6:
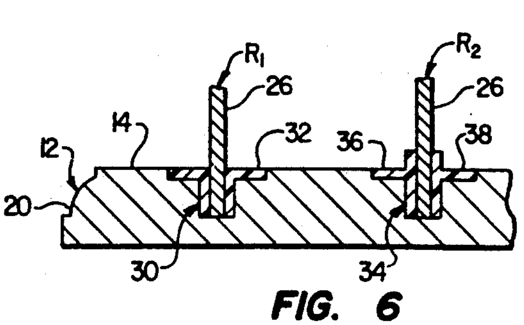
FIG. 6 is a cross-sectional view through a portion of the toy taken along line 6—6 of FIG. 5.

The lower ends of the front and rear side legs 26,28 of the rods $R_1$, $R_3$ and $R_5$–$R_{14}$ are supportingly received in spaced series of tubular plastic inserts 30 (see FIGS. 5 and 6) suitably secured in circular bores extending into the base 12 through its top side surface 14. At their upper ends, the inserts 30 are provided with radially enlarged annular flange portions 32 received in shallow circular counterbores also formed in the top side surface 14 of the base 12.

In a similar manner the lower ends of the front and rear side legs 26, 28 of the rods $R_2$ and $R_4$ are supportingly received in spaced series of tubular plastic inserts 34 (see FIGS. 5 and 6) suitable secured in circular bores extending into the base 12 through its top side surface 14. Like the inserts 30, the inserts 34 are provided with radially enlarged annular flange portions 36 received in shallow circular counterbores formed in the top side surface 14 of the base 12. For purposes later described, boss portions 38 have square cross-sections, project upwardly from the flanges 36 and circumscribe lower end portions of the front and rear side legs 26 and 28 of the rods $R_2$ and $R_4$.

Referring now to FIGS. 1 and 2, ten spherical counting beads 40 are slidably and rotatably mounted on each of the rods $R_1$, $R_3$ and $R_4$–$R_{14}$, the rods extending through slightly oversized circular bores 42 (FIG.5) formed in the beads 40. As best illustrated in FIG. 2, each vertical series of beads 40 may be moved from either of the front and rear legs 26,28 of its associated rod to the other leg as indicated by the double-ended arrow 44.

Figure 3:
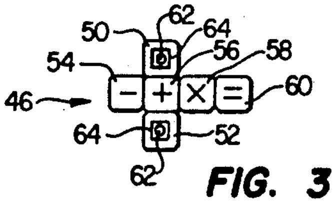
FIGS. 3 and 4 are enlarged scale developed plan views of a pair of mathematical operator bead portions of the toy.
Figure 4:
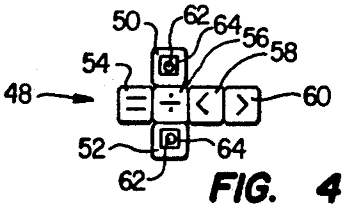

The toy 10 also includes two cube-shaped operator sign beads 46,48 respectively mounted by themselves on the rods $R_2$ and $R_4$ for rotation relative thereto and sliding translation along such rods between their opposite lower end portions. As illustrated in developed format in FIG. 3, the operator sign bead 46 has opposite end surfaces 50 and 52, and four side surfaces 54,56,58 and 60 having respectively imprinted thereon the operating signs "−", "+", "×" and "=". Extending through bead 46, between its opposite ends, is a circular bore 62 that rotatably and slidably receives the rod $R_2$.

According to a feature of the present invention, square indentations 64 are countersunk in the opposite end surfaces 50,52 of the bead 46 and circumscribe the rod $R_2$. Each of these indentations 64 is sized to complementarily and releasably receive one of the upwardly projecting square insert bosses 38 (see FIGS. 5 and 6) at the lower ends of the rod $R_2$ to thereby releasably lock the bead 46 against rotation relative to the rod $R_2$. Accordingly, as the bead 46 is moved downwardly along the front leg 26 of rod $R_2$, the bead may be rotated to move a selected one of its side faces 54,56,58,60 to a forwardly facing orientation and then moved to the bottom of the front leg 26 to cause the underlying boss 38 to upwardly enter the square indentation 64 on the bottom side 52 of the bead.

This rotationally locks the bead 46 on the rod $R_2$ with a selected one of the four operational signs on the bead facing toward the front side edge 16 of the base 12. A different one of the four operational signs on the bead 46 may be shifted to a forwardly facing orientation simply by lifting the bead off the underlying boss 38, appropriately rotating the lifted bead, and then reseating the bead on the boss 38. This same selective variance of the outwardly facing operational sign may be carried out when the bead 46 is shifted to the opposite end of the rod $R_2$ adjacent the rear side edge 18 of the base 12, in which case the insert boss 38 at the opposite end of the rod $R_2$ is upwardly received in the square indentation 64 formed in the top side surface 50 of the bead 46.

The operational sign bead 48 slidably and rotatably carried on rod $R_4$ is identical in shape, construction and operation to the bead 46 except that the bead 48 has the operational signs "=", "÷", "<", and ">" respectively imprinted on its four side surfaces 54,56,58,60. Bead 48 may be releasably locked against rotation relative to the rod $R_4$ upon which it is slidably carried by inserting one of the upwardly projecting insert bosses 38 adjacent the opposite ends of the rod into one of the square indentations 64 on the upper and lower ends of the bead 48.

Figure 7A:
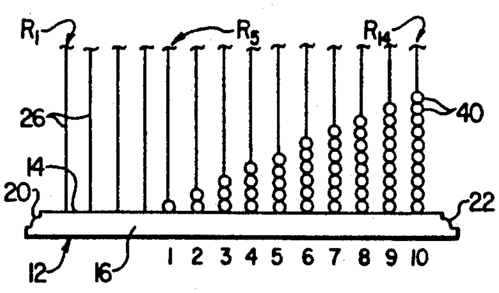
FIGS. 7A—7H are reduced scale partial front and rear side elevational views of the toy, with some of the bead portions deleted therefrom for illustrative clarity, depicting some of the various manners in which the toy may be used to illustrate mathematical equations and counting procedures.

The toy 10 may be used to teach a child various counting and numerical representation techniques as well as basic equation concepts. For example, as illustrated in FIG. 7A, with all of the beads 40, 46 and 48 initially placed on the rear side legs 28 of the rods $R_1$–$R_{14}$, appropriate ones of the counting beads 40 may be moved (either by the teacher or the child) onto selected ones of the front rod legs 26 to depict the series of numbers one through ten while at the same time dimensionally illustrating their relative magnitudes via their bead stack heights.

Figure 7B:
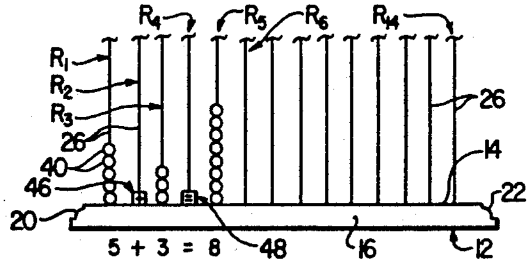

FIGS. 7B–7H depict various representative manners in which the toy 10 may be used to teach the child to construct simple equations. For example, as shown in FIG. 7B, the equation "5+3=8" may be constructed to provide the child with an easy to understand visual representation of the equation concept by simply sliding the operator sign beads 46,48 onto the front side legs 26 of their rods $R_2$ and $R_4$; respectively sliding five, three and eight counting beads 40 onto the front side legs 26 of their rods $R_1$, $R_3$ and $R_5$; rotatably adjusting the bead 46 so that its "+" indicia faces the front side edge 16 of the base 12; and rotatably adjusting the bead 48 so that its "=" indicia also faces the front side edge 16 of the base 12.

Figure 7C:
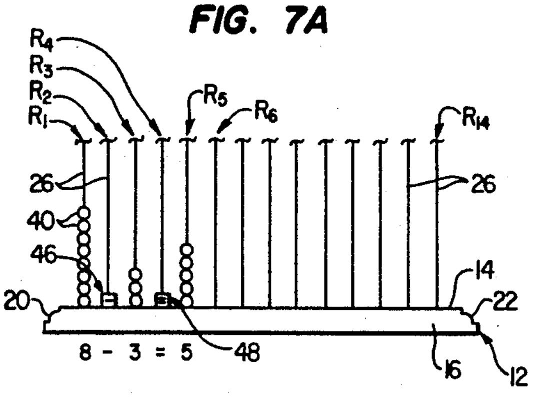
Figure 7D:
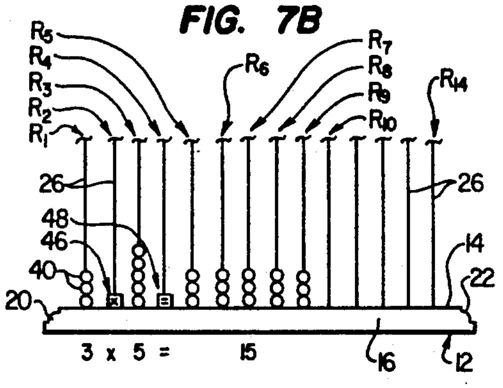
Figure 7E:
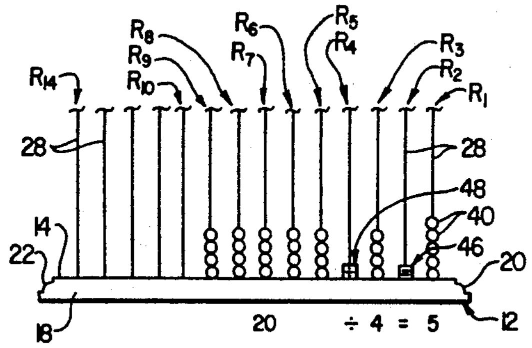
Figure 7F:
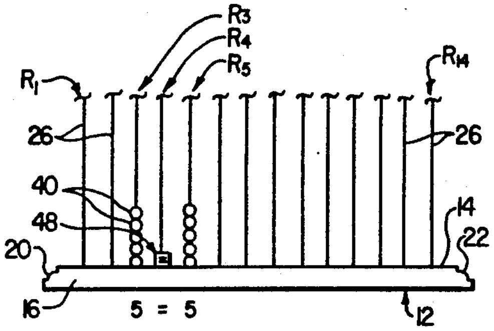
Figure 7G:
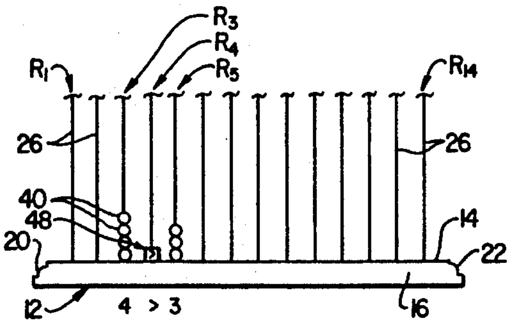
Figure 7H:
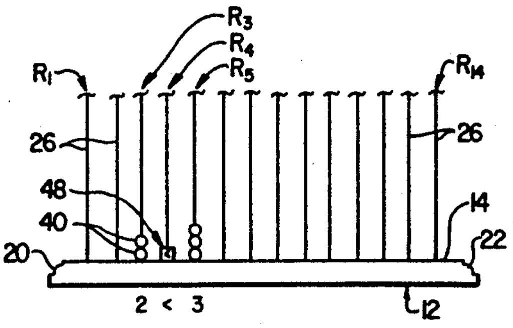

Examples of how to construct subtraction, multiplication and division equations in this same general manner are respectively shown in FIGS. 7C–7E. In instances where the number to be operated upon is greater than the ten counting beads on any given rod, the rear side of the toy may be utilized as depicted in FIG. 7E so that more than one rod (and thus more than ten counting beads) is positioned to the left of the bead 48 as view from the rear side of the toy. FIGS. 7F–7H illustrate how equalities and inequalities may be constructed in this same manner using only the operator bead 48 appropriately rotated and rotationally locked in place on its rod to forwardly present its "=", "<" or ">" sign as the case may be.

It can be readily seen from the foregoing that the toy 10 o the present invention is inexpensive to fabricate, is simple to use, and can be easily manipulated and quickly rearranged to depict a large variety of counting functions and simple equations that may be easily explained to, and understood by, a child. Because of its simple construction it is quite easy for a child to use by himself between instructional sessions. Moreover, all of the movable parts are captively retained on the rod portions of the toy, thereby eliminating the possibility that parts of the overall toy will be separated and lost.

The representational capabilities of the toy are significantly enhanced by the placement and construction of the operator sign beads 46 and 48, and the ability to releasably lock these two beads in place on either the front or rear side of the toy helps prevent a child from inadvertently changing their intended signs, while at the same permitting their signs to be very rapidly changed to selectively vary the overall mathematical representation provided by the toy.

Figure 8:
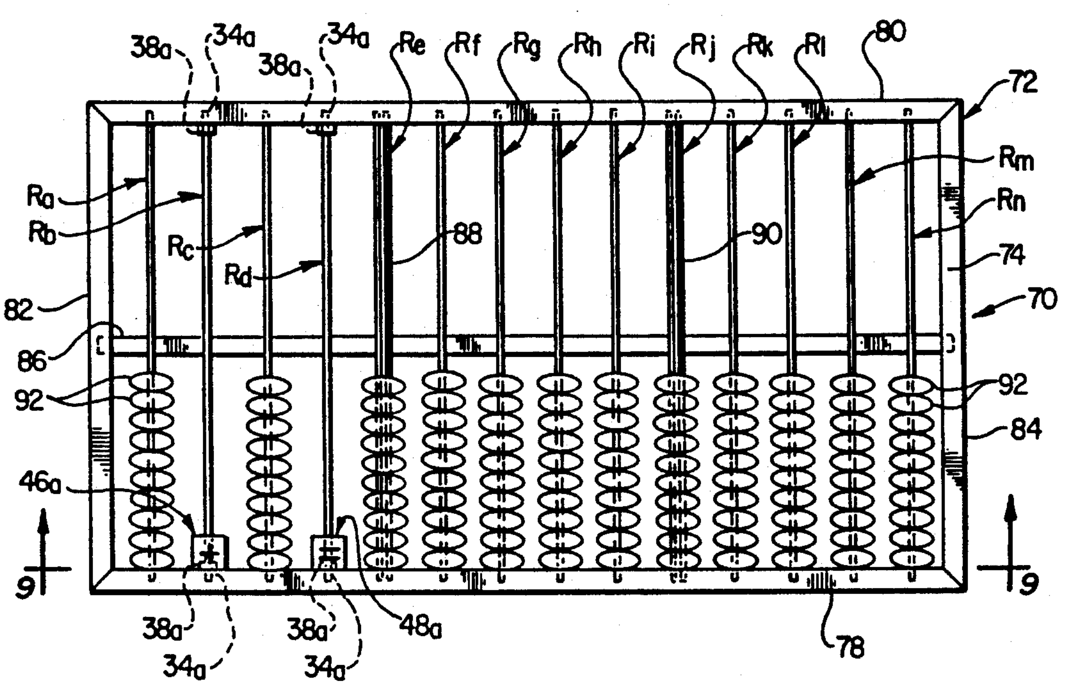
FIG. 8 is a top plan view of an alternate embodiment of the toy.
Figure 9:
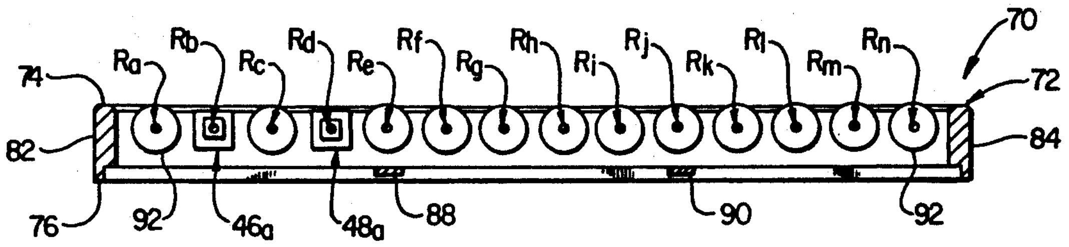
FIG. 9 is a cross-sectional view through the alternate toy embodiment taken along line 9—9 of FIG. 8.

A flat alternate embodiment 70 of the toy 10 is illustrated in FIGS. 8 and 9 and includes an open, elongated rectangular base frame 72 having top and bottom side surfaces 74 and 76, front and rear side members 7B and 80, and left and right end members 82 and 84. To reinforce the frame 72, an elongated bracing member 86 is secured at its opposite ends to central portions of the frame end members 82 and 84, and a pair of elongated bracing members 88 and 90 are secured at their opposite ends to the frame side members 78 and 80 as indicated.

A laterally spaced series of fourteen mutually parallel horizontal support rod structures $R_a$–$R_n$ are connected at their opposite ends to the frame side members 78 and 80. The opposite ends of the rod structures $R_b$ and $R_d$ extend into plastic inserts $34_a$ which are similar to the previously described inserts 38 and are provided with outwardly projecting square boss portions $38_a$.

Twelve series of ten flattened circular counting beads 92 are slidably retained on the rod structures $R_a$, $R_c$ and $R_e$–$R_n$ for movement between the frame side members 78 and 80 as previously described in conjunction with the counting beads 40 and rods $R_1$–$R_{14}$ of the toy 10. Respectively mounted on the rod structures $R_b$ and $R_d$ for sliding movement along their lengths between the opposed pairs of square bosses $38_a$ are a pair of cube-shaped operator sign beads $46_a$ and $48_a$ which are respectively identical in construction and operation to the previously described operator sign beads 46 and 48.

The toy 70 is used in the same manner as the previously described toy 10 except that the counting and operator sign beads are horizontally moved and grouped instead of vertically, and the operator sign beads are rotationally locked to the square bosses $38_a$ at horizontally opposite end faces of the beads instead of at vertically opposite end faces. Accordingly, with the user facing the front side of the frame 70, and all of the beads disposed on rear end portions of the rods $R_a$–$R_n$, selected counting procedures and equations may be depicted by sliding selected groups of the beads to the forward ends of their associated rod structures.

It will be readily appreciated that in both of the illustrated embodiments of the toy, a greater or lesser number of rods, having a greater or lesser number of counting beads thereon, could be used if desired. Additionally, if desired, more than one counting bead rod can be positioned on each side of each of the two operational sign beads, and the operational sign beads could be provided with convex polygonal cross-sections other than the illustrated square cross-sections thereof.

The foregoing detailed description is to be clearly understood as being given by way of illustration and example only, the spirit and scope of the present invention being limited solely by the appended claims.

What is claimed is:

1. An educational toy useable to visually teach selectively variable mathematical relationships to children, comprising:

a base portion;

a series of first rod members each having first and second end portions;

two second rod members each having first and second end portions;

means for anchoring said first and second end portions of said first and second rod members to said base portion in a manner positioning said first and second rod members in a mutually spaced side-by-side array in which said first end portions are generally parallel to one another and disposed on one side of the array, said second end portions are generally parallel to one another and disposed on an opposite side of the array, and each of said second rod members is interposed between a different pair of said first rod members;

series of counting beads captively carried by said first rod members for sliding movement thereon between said first and second end portions thereof;

first and second operational sign beads respectively and captively carried by said second rod members for rotation relative thereto and sliding movement thereon between said first and second end portions thereof, each of said first and second operational sign beads having a side periphery circumscribing its associated second rod member and defined by flattened areas a selectively variable one of which may be rotated to an orientation in which it generally faces the user of the toy;

mathematical operating sign indicia disposed on said flattened areas of said first and second operational sign beads; and cooperating interengageable means on said base portion and said first and second operational sign beads for releasably locking said first and second operational sign beads against rotation relative to their associated second rod members when said first and second operational sign beads are moved along either of said first and second end portions to positions adjacent said base portion.

2. The educational toy of claim 1 wherein:

each of said first and second operational sign beads has a generally cubic shape, whereby the number of flattened side periphery areas on each of said first and second operational sign beads is four.

3. The educational toy of claim 2 wherein:

said mathematical sign indicia disposed on the four flattened side periphery areas of said first operational sign bead comprise the symbols "+", "−", "×" and "=", and said mathematical sign indicia disposed on the four flattened side periphery areas of said second operational sign bead include the symbol "=".

4. The educational toy of claim 3 wherein:

said mathematical sign indicia disposed on the four flattened side peripheries of said second operational sign bead further include the symbols "÷", "<" and ">".

5. The educational toy of claim 1 wherein said cooperating means include:

boss members projecting outwardly from said base portion and inwardly along the opposite outer ends of said second rod members, and indentations formed in opposite ends of each operational sign bead spaced apart along its associated second rod member, each of said indentations being configured to releasably and nonrotatably receive one of said boss members positioned at the outer ends of its associated second rod member.

6. The educational toy of claim 5 wherein:

said boss members and said indentations have generally square cross-sections.

7. The educational toy of claim 5 wherein:

said means for anchoring include spaced series of hollow insert members received in said base portion, said insert members receiving the opposite outer ends of said first and second rod members, and said boss members are formed integrally with the insert members which receive the opposite outer ends of said second rod members.

8. The educational toy of claim 1 wherein:

the total number of said first rod members is twelve, and the total number of said counting beads on each of said first rod members is ten.

9. The educational toy of claim 1 wherein:

said first and second rod members have generally inverted U-shapes, with the lower ends of said first and second rod members being anchored to a top side of said base portion.

10. The educational toy of claim 1 wherein:

said base portion includes a horizontally positionable open frame member having horizontally opposite front and rear side portions, and said first and second rod members have generally straight configurations and are anchored at their opposite ends to said front and rear side portions of said open frame member.

* * * * *

UNITED STATES PATENT AND TRADEMARK OFFICE

CERTIFICATE OF CORRECTION

PATENT NO. : 5,205,747

DATED : April 27, 1993

INVENTOR(S) : Daravuth Tan

It is certified that error appears in the above-indentified patent and that said Letters Patent is hereby corrected as shown below:

Column 5, line 10, "o" should be --of--.

Column 5, line 32, "7B" should be --78--.

Signed and Sealed this

Twenty-sixth Day of April, 1994

Attest:

BRUCE LEHMAN

*Attesting Officer* — *Commissioner of Patents and Trademarks*